(12) United States Patent
Kim (10) Patent No.: US 11,605,297 B2
(45) Date of Patent: Mar. 14, 2023

(54) VEHICLE AND CONTROLLING METHOD THEREOF

(71) Applicants: Hyundai Motor Company, Seoul (KR); Kia Motors Corporation, Seoul (KR)

(72) Inventor: Donghyuk Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 201 days.

(21) Appl. No.: 17/091,239

(22) Filed: Nov. 6, 2020

(65) Prior Publication Data

US 2021/0407297 A1 Dec. 30, 2021

(30) Foreign Application Priority Data

Jun. 24, 2020 (KR) ........................ 10-2020-0077389

(51) Int. Cl.
| | |
|---|---|
| *G08G 1/16* | (2006.01) |
| *H04N 1/00* | (2006.01) |
| *H04W 4/44* | (2018.01) |
| *H04W 4/024* | (2018.01) |
| *B60T 7/22* | (2006.01) |
| *B60W 60/00* | (2020.01) |
| *G01C 21/34* | (2006.01) |
| *B60T 8/17* | (2006.01) |

(52) U.S. Cl.
CPC ............... *G08G 1/164* (2013.01); *B60T 7/22* (2013.01); *B60T 8/17* (2013.01); *B60W 60/001* (2020.02); *G01C 21/3407* (2013.01); *H04N 1/00103* (2013.01); *H04W 4/024* (2018.02); *H04W 4/44* (2018.02); *B60T 2210/32* (2013.01); *B60W 2554/4049* (2020.02); *B60W 2756/10* (2020.02)

(58) Field of Classification Search
CPC ........ G08G 1/164; H04W 4/024; H04W 4/44; B60W 60/001; B60W 2756/10; B60W 2554/4049; B60T 7/22; B60T 8/17; B60T 2210/32; G01C 21/3407; H04N 1/00103
See application file for complete search history.

(56) References Cited

U.S. PATENT DOCUMENTS

| | | | | |
|---|---|---|---|---|
| 8,260,489 | B2* | 9/2012 | Nielsen | G07C 5/085 |
| | | | | 701/32.2 |
| 10,156,848 | B1* | 12/2018 | Konrardy | B60W 30/18163 |
| 10,930,090 | B2* | 2/2021 | Cordova | G07C 5/008 |
| 2013/0124084 | A1* | 5/2013 | Seo | G01C 21/3638 |
| | | | | 701/436 |

(Continued)

FOREIGN PATENT DOCUMENTS

KR 10-2019-0140499 A 12/2019

*Primary Examiner* — Hussein Elchantiz
(74) *Attorney, Agent, or Firm* — Fox Rothschild LLP (57) ABSTRACT

A vehicle includes a communicator that is mounted on the vehicle to perform wireless communication with a server and a controller operates the communicator to transmit an accident reception request signal and image data acquired by another vehicle to the server when the vehicle has an accident with an accident target vehicle. The controller operates the communicator to receive a fault ratio from the server when the server generates fault ratio data between the vehicle and the accident target vehicle based on the image data.

16 Claims, 8 Drawing Sheets

(56) References Cited

U.S. PATENT DOCUMENTS

| | | | | |
|---|---|---|---|---|
| 2013/0179198 A1* | 7/2013 | Bowne | ............... | G07C 5/08 |
| | | | | 705/4 |
| 2013/0317865 A1* | 11/2013 | Tofte | ............... | G06Q 10/06 |
| | | | | 705/4 |
| 2014/0002651 A1* | 1/2014 | Plante | ............... | H04N 5/76 |
| | | | | 348/148 |
| 2014/0012492 A1* | 1/2014 | Bowers | ............... | G08G 1/16 |
| | | | | 701/301 |
| 2014/0047371 A1* | 2/2014 | Palmer | ............ | H04N 21/47205 |
| | | | | 715/771 |
| 2015/0254781 A1* | 9/2015 | Binion | ............... | B60R 21/00 |
| | | | | 701/32.2 |
| 2016/0275790 A1* | 9/2016 | Kang | ............... | G08G 1/096716 |
| 2017/0217429 A1* | 8/2017 | Shioe | ............... | B60W 30/08 |
| 2017/0300503 A1* | 10/2017 | Wang | ............... | G06F 16/70 |
| 2019/0196481 A1* | 6/2019 | Tay | ............... | G05D 1/0289 |
| 2019/0311546 A1* | 10/2019 | Tay | ............... | G06T 5/50 |
| 2021/0407297 A1* | 12/2021 | Kim | ............... | G08G 1/205 |

\* cited by examiner

VEHICLE AND CONTROLLING METHOD THEREOF

CROSS-REFERENCE TO RELATED APPLICATION(S)

This application is based on and claims priority under 35 U.S.C. § 119 to Korean Patent Application No. 10-2020-0077389, filed on Jun. 24, 2020 the disclosure of which is incorporated by reference in its entirety.

BACKGROUND

1. Technical Field

The present disclosure relates to a vehicle and a controlling method thereof, more particularly, to a vehicle and a controlling method capable of acquiring a fault ratio with another vehicle when an accident occurs in an autonomous vehicle.

2. Description of the Related Art

With the development of the automobile technology, the development of autonomous vehicle that operate by themselves without driver's manipulation is expected to progress rapidly. The autonomous vehicle rely on sensors mounted on the vehicle and also improve the completeness of autonomous driving by utilizing V2X (Vehicle to Everything Communication) communication.

However, the amount of data transmitted and received by autonomous vehicles is vast, and the road environment includes many unpredictable factors, and thus an accident risk and post-accident processing are inevitable like conventional non-autonomous vehicles. In the case of a non-autonomous vehicles, the driver exits the vehicle at the time of an accident, determines the site of the accident, and calls an insurance company. However, a vehicle stopped in this process may cause a secondary accident and adversely affect traffic flow.

SUMMARY

In view of the above, an aspect of the present disclosure provides a vehicle and a control method thereof that do not require post-accident processing by a driver when an accident occurs. In accordance with an aspect of the present disclosure, a vehicle may include a communicator mounted on the vehicle and configured to perform wireless communication with a server; and a controller configured to operate the communicator to transmit an accident reception request signal and image data acquired by another vehicle to the server when the vehicle has an accident with an accident target vehicle, and operate the communicator to receive a fault ratio from the server when the server generates fault ratio data between the vehicle and the accident target vehicle based on the image data.

The controller may be configured to operate the communicator to transmit the image data of the other vehicle within a predetermined radius from the vehicle to the server. The controller may also be configured to to change the predetermined radius according to the type of road on which the vehicle is driving. The controller may be configured to operate a braking device of the vehicle to stop the vehicle when the vehicle has an accident with the accident target vehicle. The controller may further be configured to determine a driving possible state of the vehicle and operate the vehicle to move to a shoulder in response to receiving at least one of the image data and the fault ratio data while the vehicle is in the driving possible state.

The controller may be configured to determine the driving possible state of the vehicle and operate the vehicle and guide the vehicle along a driving route to a hospital in response to receiving at least one of the image data and the fault ratio data while the vehicle is in the driving possible state. The controller may be configured to operate the communicator to receive the image data directly from the other vehicle. The controller may be configured to request the image data from the other vehicles traveling on left or right sides of the vehicle when the vehicle accident occurs in front or rear of the vehicle. The controller may be configured to request the image data from the other vehicles running in front or rear of the vehicle when the vehicle accident occurs on a side of the vehicle.

In accordance with an aspect of the present disclosure, a controlling method of a vehicle performing a wireless communication with a server, the method may include: transmitting an accident reception request signal and image data acquired by another vehicle to the server when the vehicle has an accident with an accident target vehicle; and receiving a fault ratio from the server when the server generates fault ratio data between the vehicle and the accident target vehicle based on the image data.

The transmitting of the image data to the server may include transmitting the image data of the other vehicle within a predetermined radius from the vehicle to the server. The transmitting the image data to the sever may include changing the predetermined radius according to a type of road on which the vehicle is driving.

The method may further include operating a braking device of the vehicle to stop the vehicle when the vehicle has an accident with the accident target vehicle. The operating the braking device may include determining a driving possible state of the vehicle and operating the vehicle to move to a shoulder in response to receiving at least one of the image data and the fault ratio data while the vehicle is in the driving possible state. Additionally, the operation of the braking device may include determining the driving possible state of the vehicle and operating the vehicle and guiding the vehicle along a driving route to a hospital in response to receiving at least one of the image data and the fault ratio data while the vehicle is in the driving possible state.

The receiving of the image data may include operating the communicator to receive the image data directly from the other vehicle. The transmitting of the image data to the server may include requesting the image data from the other vehicles traveling on left or right sides of the vehicle when the vehicle accident occurs in front or rear of the vehicle. In addition, the transmitting of the image data to the server may include requesting the image data from the other vehicles running in front or rear of the vehicle when the vehicle accident occurs on a side of the vehicle.

In accordance with an aspect of the present disclosure, a computer program stored on a non-transitory computer recording medium, combining with a computing device, the computer program may comprise to perform: transmitting an accident reception request signal and image data acquired by another vehicle to the server when the vehicle has an accident with an accident target vehicle, and receiving a fault ratio from the server when the server generates fault ratio data between the vehicle and the accident target vehicle based on the image data.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like reference numerals refer to like elements throughout. The present disclosure does not describe all elements of the exemplary embodiments, and overlaps between the general contents or the embodiments in the technical field to which the present invention belongs. This specification does not describe all elements of the exemplary embodiments of the present disclosure and detailed descriptions on what are well known in the art or redundant descriptions on substantially the same configurations may be omitted. The term 'part, module, member, block' used in the specification may be implemented in software or hardware, and a plurality of 'part, module, member, block' may be embodied as one component, It is also possible that one 'part, module, member, block' includes a plurality of components.

Throughout the specification, when an element is referred to as being "connected to" another element, it may be directly or indirectly connected to the other element and the "indirectly connected to" includes being connected to the other element via a wireless communication network. In addition, when a part is said to "include" a certain component, this means that it may further include other components, except to exclude other components unless otherwise stated.

Throughout the specification, when a member is located "on" another member, this includes not only when one member is in contact with another member but also when another member exists between the two members. The terms first, second, etc. are used to distinguish one component from another component, and the component is not limited by the terms described above. Singular expressions include plural expressions unless the context clearly indicates an exception. In each step, the identification code is used for convenience of description, and the identification code does not describe the order of each step. Each of the steps may be performed out of the stated order unless the context clearly dictates the specific order.

Figure 1:
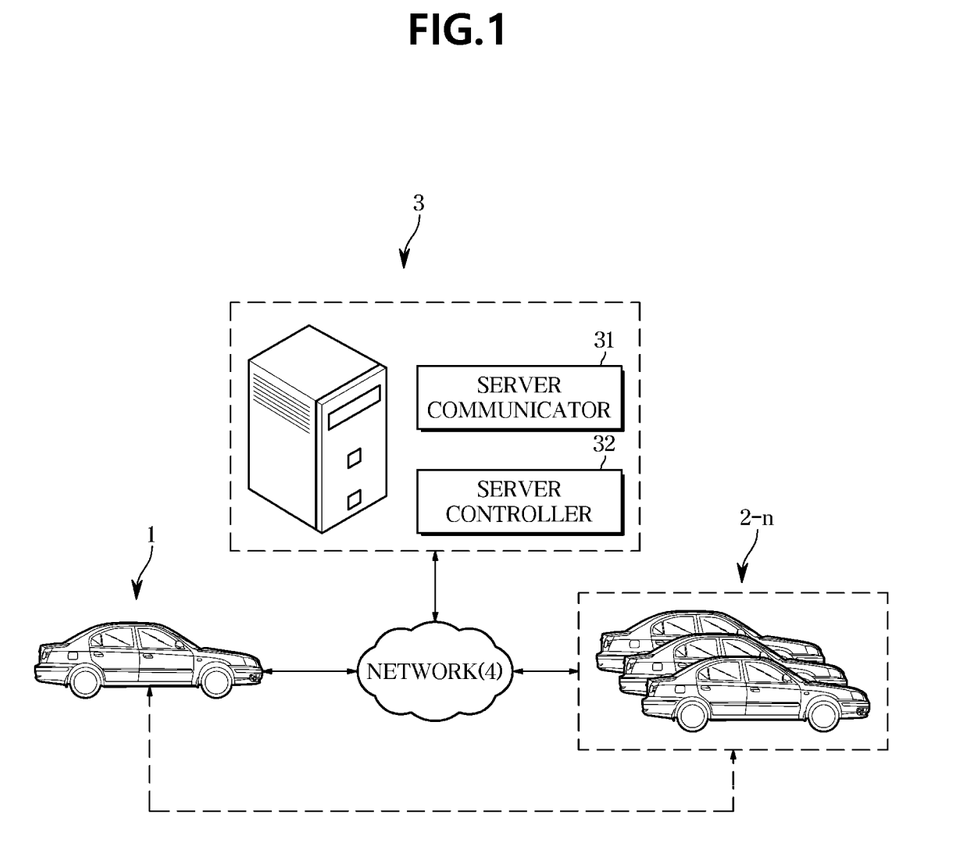
FIG. 1 illustrates a system in which a vehicle and a server are implemented according to an exemplary embodiment.
Figure 2:
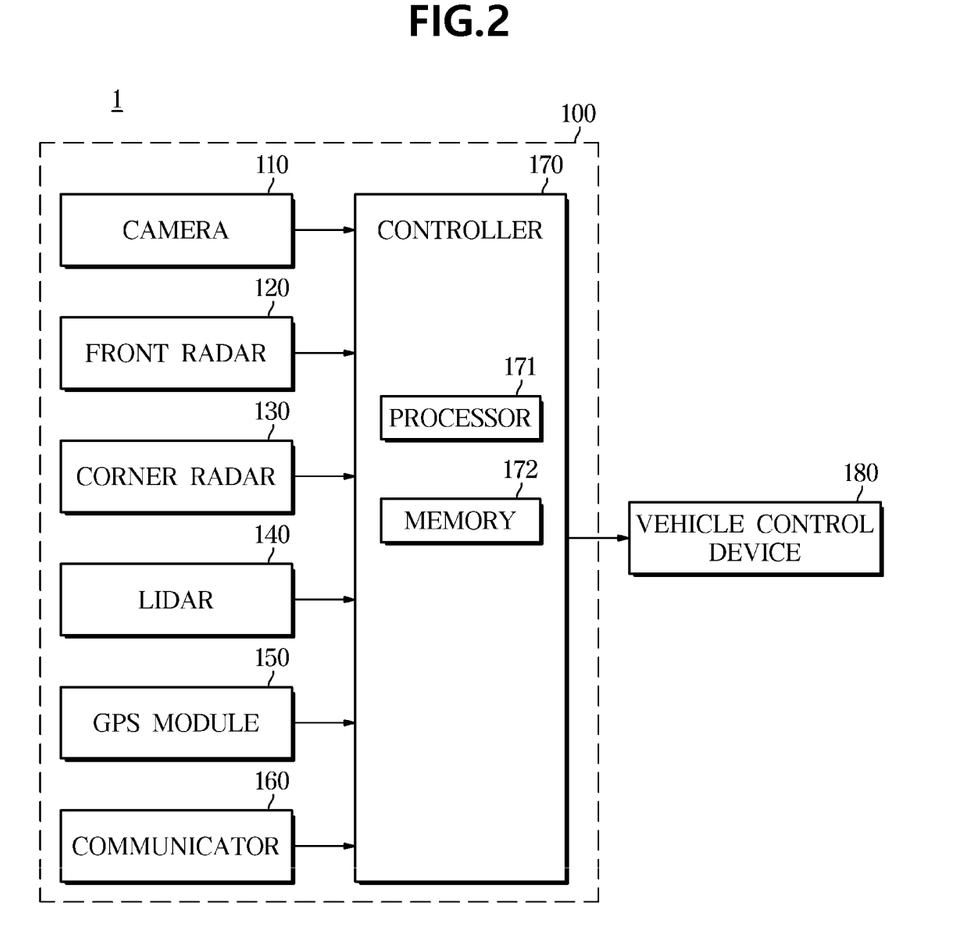
FIG. 2 illustrates a control block diagram of a vehicle according to an exemplary embodiment.

Hereinafter, with reference to the accompanying drawings will be described the working principle and exemplary embodiments of the present invention. FIG. 1 illustrates a system in which a vehicle and a server are implemented according to an exemplary embodiment. And FIG. 2 illustrates a control block diagram of a vehicle according to an exemplary embodiment.

The system according to the disclosed invention may include a server 3 configured to detect an occurrence of an accident and generate fault ratio data by collecting image data from a first vehicle 1 acquiring an image data and fault ratio data from a plurality of second vehicles 2-n via the network 4. The server 3 may include a server communicator 31 and a server controller 32, and the server communicator 31 may be configured to perform wireless communication with the first vehicle 1 and the plurality of second vehicles 2-n, and the server controller 32 may be configured to generate fault ratio data based on information transmitted and received by the server communicator 31.

The first vehicle 1 is a vehicle that acquires fault ratio data from the server 3 when an accident occurs, and transmits an accident request signal to the server 3 and causes the server 3 to collect image data. The first vehicle 1 may be configured to operate the server 3 to collect image data from a plurality of second vehicles 2 in the vicinity of the first vehicle 1 by transmitting an accident request signal to the server 3. Accordingly, the first vehicle 1 may be configured to provide location information to the server 3, and enable the server 3 to collect image data of a plurality of second vehicles 2 within a predetermined radius from the first vehicle 1.

In addition, the first vehicle 1 may be configured to directly collect image data from the plurality of second vehicles 2-n via V2V (Vehicle to Vehicle) communication without going through the server 3. In particular, the first vehicle 1 may be configured to directly transmit the collected image data to the server 3 so that the server 3 may generate fault ratio data based on the image data. The first vehicle 1 may include a driver assistance system 100 and a vehicle control device 180. Particularly, the driver assistance system 100 corresponds to an example of a system for performing autonomous driving. In addition, the configuration of the first vehicle 1 described in FIG. 2 can also be applied to the configuration of the second vehicle 2.

The vehicle 1 according to an embodiment includes a driver assistance system 100 and a vehicle control device 180. The vehicle control device 180 may be configured to perform an operation of controlling the driving of the vehicle in conjunction with an acceleration device (not shown), a deceleration device (not shown), a steering device (not shown), and a braking device (not shown). The vehicle control device 180 does not use control signals such as an acceleration device, a deceleration device, a steering device, and a braking device that the driver directly manipulates in the autonomous driving mode, but executes operations such as an acceleration device, a deceleration device, a steering device, and a braking device based on an autonomous driving signal input using CAN (Controller Area Network) communication.

The driver assistance system 100 may include a camera 110 (or other imaging device), a front radar 120, a plurality of corner radars 130, a LIDAR 140, a global positioning system (GPS) module 150, and a communicator 160. The camera 110 may include a front camera configured to capture a field of view toward the front of the vehicle 1 and a lateral camera configured to secure a field of view toward the side of the vehicle 1 (not shown). The front camera may be installed on the front windshield of the vehicle 1. The front camera may be configured to photograph the front of the vehicle 1 and acquire image data in front of the vehicle 1. The image data in front of the vehicle 1 may include location information on at least one of other vehicles, pedestrians, cyclists, lanes, curbs, guardrails, street trees, and street lights located in front of the vehicle 1.

The camera 110 may be configured to detect the occurrence of an accident by capturing the movement of another vehicle located in front of the first or subject vehicle. Specifically, the camera 110 may be configured to provide image data to the controller 170, and the controller 170 may be configured to process the image data to determine that an accident has occurred when the motion of another vehicle located in front is not detected for a predetermined period of time or longer, and determine that the accident vehicle is impossible to drive. The camera 110 may include a plurality of lenses and an image sensor. The camera 110 may be configured to transmit image data of an external field of view of the vehicle 1 to the controller 170.

The front radar 120 may have a field of sensing 120a facing the front of the first vehicle 1. The front radar 120 may be installed, for example, on a grille or bumper of the vehicle 1. The front radar 120 may include a transmission antenna (or a transmission antenna array) that radiates a transmission wave toward the front of the first vehicle 1, and a reception antenna (or a reception antenna array) that receives a reflected wave reflected from an obstacle.

The front radar 120 may be configured to acquire front radar data from a transmitted radio wave transmitted by a transmitting antenna and a reflected radio wave received by a receiving antenna. The front radar data may include location information and speed levels of other vehicles or pedestrians or cyclists located in front of the vehicle 1 (e.g., first or subject vehicle). The front radar 120 may be configured to calculate the relative distance to the obstacle based on the phase difference (or time difference) between the transmitted and reflected waves, and calculate the relative speed of the obstacle based on the frequency difference between the transmitted and reflected waves. The front radar 120 may be configured to transmit the front radar data to the controller 170.

The plurality of corner radars 130 may include a first corner radar (not shown) installed on the front right side of the vehicle 1, a second corner radar (not shown) installed on the front left side of the vehicle 1, a third corner radar (not shown) installed on the rear right side of 1) and a fourth corner radar (not shown) installed on the rear left side of the vehicle 1. The first corner radar (not shown) may have a sensing field of view directed to the front right side of the vehicle 1. The first corner radar (not shown) may be installed on the right side of the front bumper of the vehicle 1.

The second corner radar (not shown) may have a sensing field of view toward the front left of the vehicle 1 and may be installed on the left side of the front bumper of the vehicle 1. The third corner radar (not shown) may have a detection field of view toward the rear right of the vehicle 1 and may be installed on the right side of the rear bumper of the vehicle 1. The fourth corner radar (not shown) may have a detection field of view toward the rear left of the vehicle 1 and may be installed on the left side of the rear bumper of the vehicle 1.

Each of the first, second, third and fourth corner radars may include a transmit antenna and a receive antenna. The first, second, third, and fourth corner radars may be configured to obtain first corner radar data, second corner radar data, third corner radar data, and fourth corner radar data, respectively. The first corner radar data may include distance information and speed levels of other vehicles, pedestrians, or cyclists located on the front right side of the vehicle 1. The second corner radar data may include distance information and speed level of an obstacle positioned on the front left of the vehicle 1. The third and fourth corner radar data may include distance information and speed information of obstacles located at the rear right of the vehicle 1 and the rear left of the vehicle 1.

The first, second, third and fourth corner radars may be configured to transmit first, second, third, and fourth corner radar data to the controller 170, respectively. That is, the front radar and the corner radar are obstacle detection units, and may be configured to detect obstacles in the front and left and right sides of the vehicle, and transmit obstacle information on the detected obstacle to the controller 170. In particular, the obstacle information may include position information of the obstacle, and the position information of the obstacle may include distance information and direction information of the obstacle.

The LIDAR 140 may be installed on the vehicle 1 to have an external view of the vehicle 1. For example, the LIDAR 140 may be mounted on a front bumper, radiator grill, hood, roof, door, side mirror, tail gate, trunk lid or fender. The GPS module 150 may be configured to detect vehicle location information and time information. After detecting the distance information from the satellite and the time information at which the distance information is measured, the GPS module 150 may be configured to detect three-dimensional location information according to latitude, longitude, and altitude by applying a trigonometry to the detected distance information, and provides location information and time information to the controller 170.

The communicator 160 may be configured to communicate with the server 3 to transmit and receive various types of information. The communicator 160 may be configured to receive the location information received by the GPS module 150 and determine a current region based on the location information. In addition, the communicator 160 may be configured to determine in which lane the vehicle 1 is driving in the current region and provide lane information to the controller 170.

The communicator 160 may include a V2V communication module (not shown) for wireless communication between vehicles and a V2I communication module (not shown) for wireless communication between the vehicle and road infrastructure. The communicator 160 is not limited thereto, and may further include a Vehicle to Pedestrian (V2P) communication module for communication between a vehicle and a pedestrian, and a Vehicle to Nomadic Devices (V2N) communication module for communication between the vehicle and a personal terminal.

The controller 170 may include an image signal processor that is a processor 171 that processes image data of the camera 110 and/or a digital signal processor that processes radar data of the radars 120 and 130 and/or a micro control unit (Micro Control Unit, MCU) generating a braking signal. When image information (i.e., image data) is received from the camera 110 while performing the autonomous driving mode, the controller 170 may be configured to perform image processing to recognize the lane of the road, and recognize the own lane in which the own vehicle is traveling based on the recognized position information of the lane. Additionally, in response to determining that both lanes of the own lane are recognized and that both lanes are recognized, the controller 170 may be configured to execute autonomous driving based on both recognized lanes. The controller 170 may also be configured to perform image processing to obtain information on a lane in which the vehicle is traveling.

The controller 170 may be configured to detect obstacles in front of the vehicle 1 (e.g., other vehicles, pedestrians, cyclists, curbs, guardrails, street trees, street lights, etc.) based on the image data of the camera 110 and the front radar data of the front radar 120. Specifically, the controller 170 may be configured to acquire position information (e.g., distance and direction) and speed information (e.g., relative speed) of obstacles in front of the vehicle 1 based on the front radar data of the front radar 120. The controller 170 may be configured to acquire location information (e.g., direction) and type information (e.g., whether the obstacle is another vehicle, or a pedestrian, or a cyclist, or a curb, or a guardrail, or a street tree, or a streetlight, etc.) of obstacles in front of the vehicle 1 based on the image data of the camera 110.

The memory 172 may be configured to store a program and/or data for processing image data, and a program and/or data for processing radar data, and programs and/or data for generating a braking signal and/or a warning signal generated by processor 171. The memory 172 may be configured to temporarily store image data received from the camera 110 and/or radar data received from the radars 120 and 130, and temporarily store the processing result of the image data and/or radar data in the memory 172.

The memory 172 may be implemented in at least one of a nonvolatile memory devices such as cache, Read Only Memory (ROM), Programmable ROM (PROM), Erasable Programmable ROM (EPROM), Electrically Erasable Programmable ROM (EEPROM), and Flash memory, or a volatile memory devices such as random access memory (RAM), or a Storage media such as hard disk drive (HDD, Hard Disk Drive), CD-ROM, but is not limited thereto.

Figure 3:
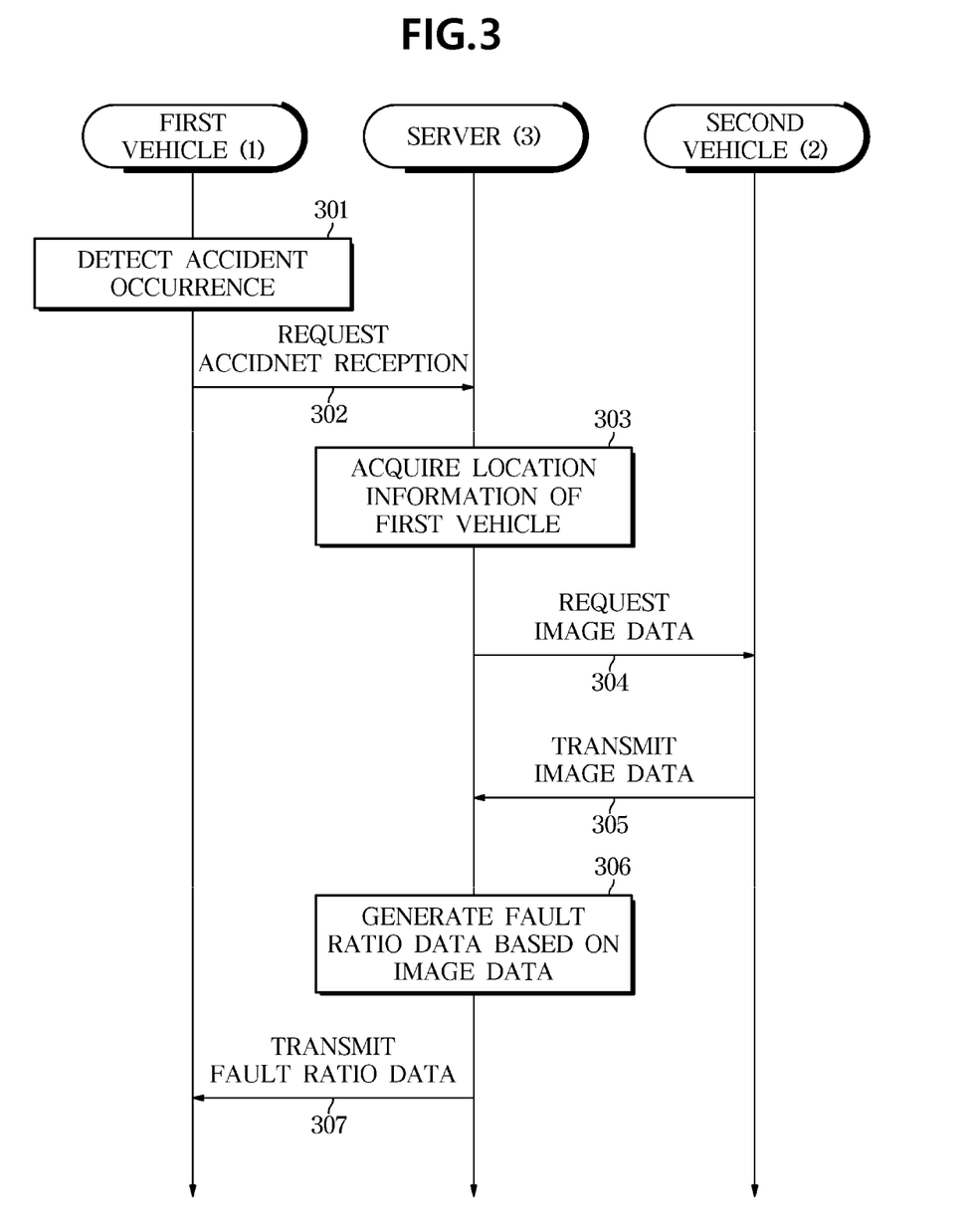
FIG. 3 illustrates a flowchart of a vehicle control according to an exemplary embodiment.
Figure 4:
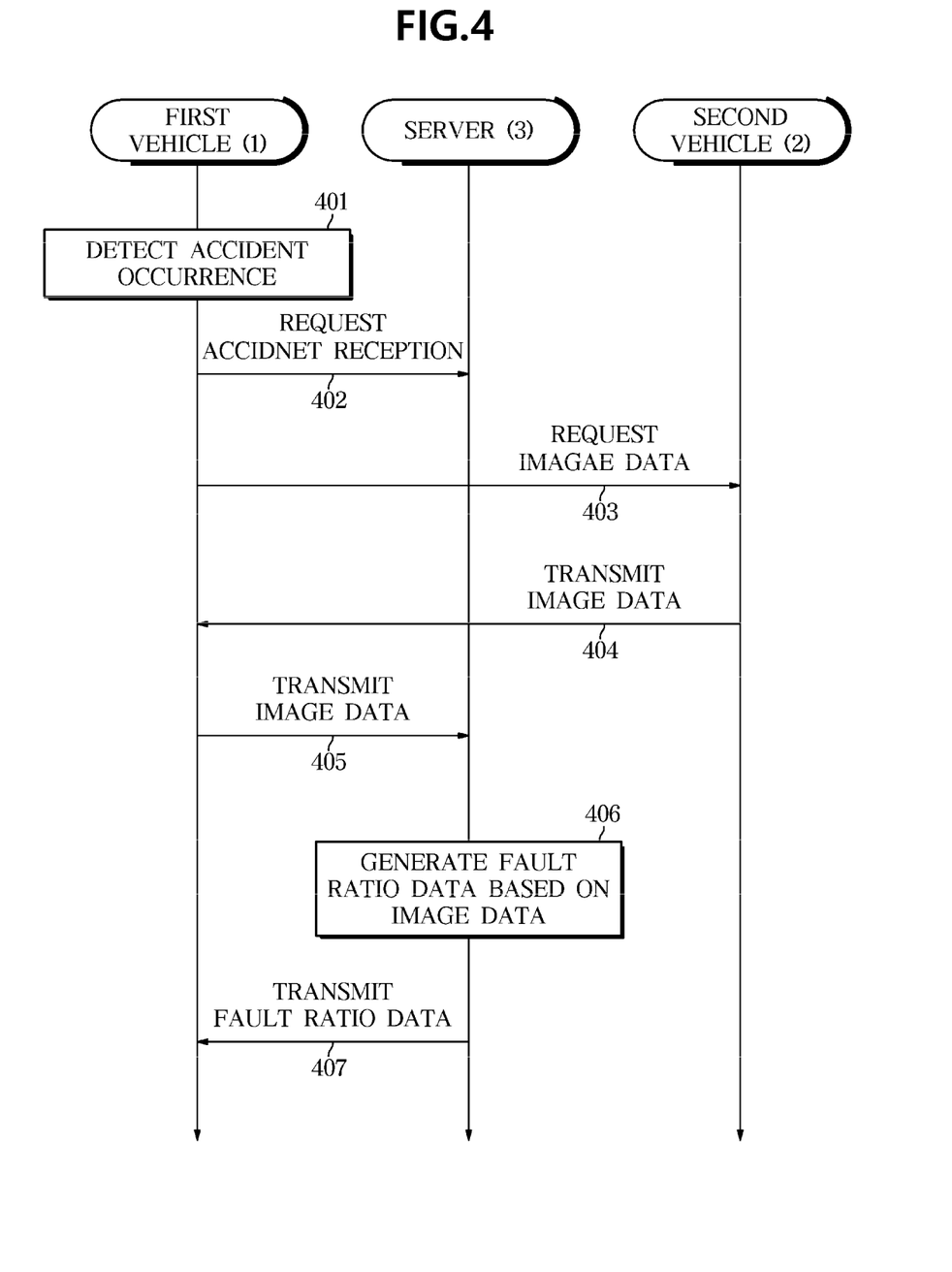
FIG. 4 illustrates a flowchart of a vehicle control according to an exemplary embodiment.

FIG. 3 and FIG. 4 illustrate a flowchart of a vehicle control according to an exemplary embodiment. Referring to FIG. 3, the first or subject vehicle 1 may be configured to detect an accident (301) and transmit an accident request signal to the server 3 (302). At this time, in order for the server 3 to determine the fault ratio between the first vehicle 1 and the accident target vehicle, the first vehicle 1 may be configured to transmit the location information of the accident location along with the accident request signal.

When the server 3 acquires the location information of the first vehicle 1 (303), the server 3 may be configured to transmit a signal requesting image data to a plurality of second vehicles 2 located around the first vehicle 1. At this time, at least some of the plurality of second vehicles 2 may be configured to transmit image data to the server 3 (305). When the server 3 receives the image data, the server 3 may be configured to generate fault ratio data based on the image data. The image data refers to data photographed immediately after a collision between the first vehicle 1 and the accident target vehicle, and the image data may correspond to image information photographed from various angles allowing the fault ratio between the two to be calculated. The server 3 may be configured to analyze the image data obtained from the outside of the first vehicle 1 by the second vehicle 2 and calculate a fault between the two through application of a simulation program stored in advance and current traffic regulations. In addition, the server 3 may be configured to request the image data to an expert in real time to generate fault ratio data through the fault ratio assessed by the expert. The server 3 may be configured to transmit the generated fault ratio data to the first vehicle 1 (306).

Meanwhile, the control according to FIG. 3 is a method in which the server 3 acquires image data from a plurality of second vehicles 2 in response to a request for receiving an accident from the first vehicle 1. However, in the vehicle 1 according to an exemplary embodiment, the first vehicle 1 may be configured to directly acquire image data from the plurality of second vehicles 2 via V2V communication without passing through the server 3.

Referring to FIG. 4, the first vehicle 1 may be configured to detect an accident (401) and transmit an accident request signal to the server 3 (402). In addition, after detecting the occurrence of an accident, the first vehicle 1 may be configured to transmit a signal requesting image data to a plurality of second vehicles 2 around the first vehicle 1 (403). Meanwhile, the second vehicle 2 receiving the image data request must be in a position capable of capturing a situation before and after the accident between the first vehicle 1 and the accident target vehicle. In particular, an object for which the first vehicle 1 requests image data may be limited by various criteria. In this regard, it will be described with reference to FIGS. 5 to 7.

Figure 5:
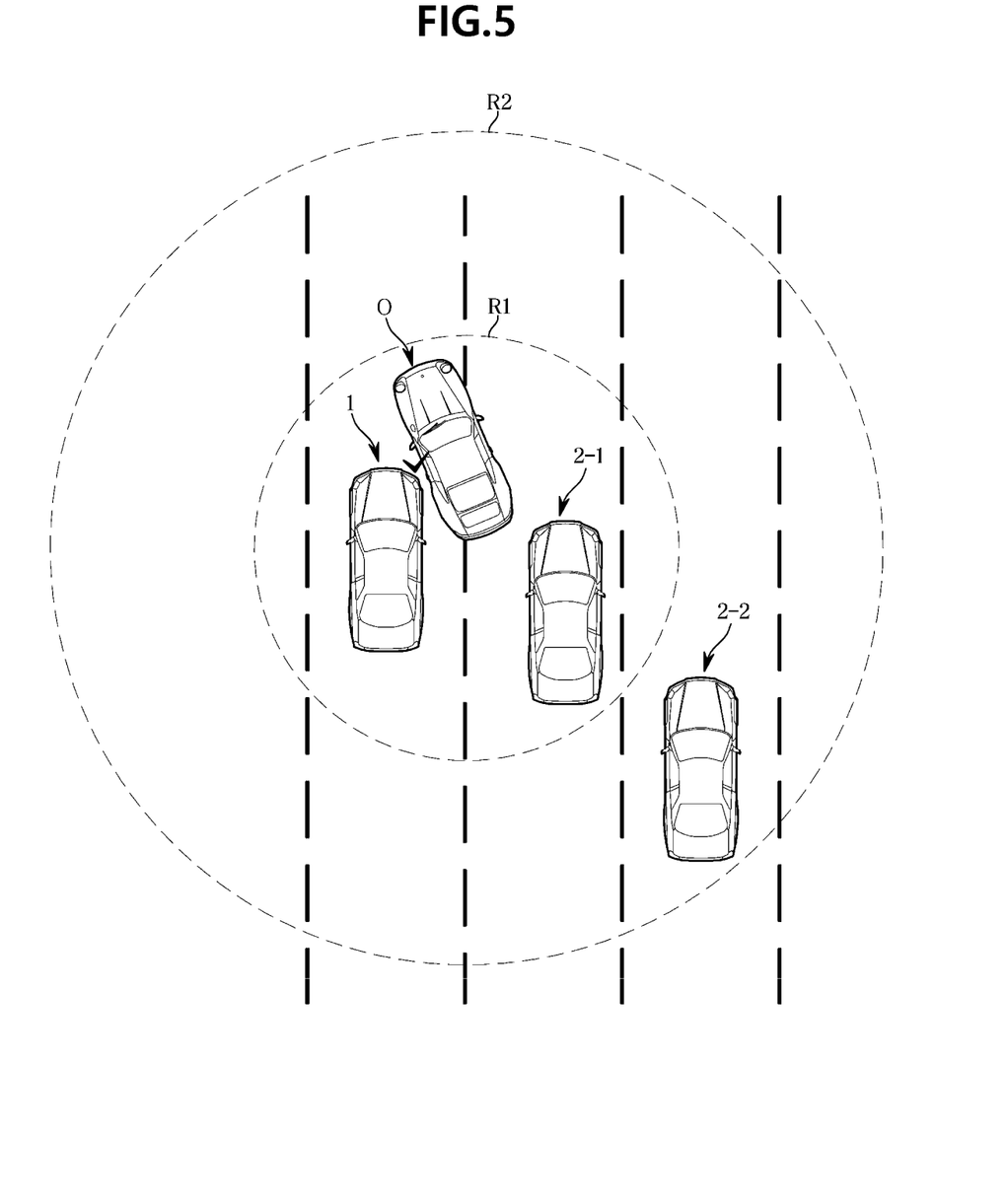
FIG. 5 illustrates a radius at which a vehicle collects image data according to an exemplary embodiment.
Figure 6:
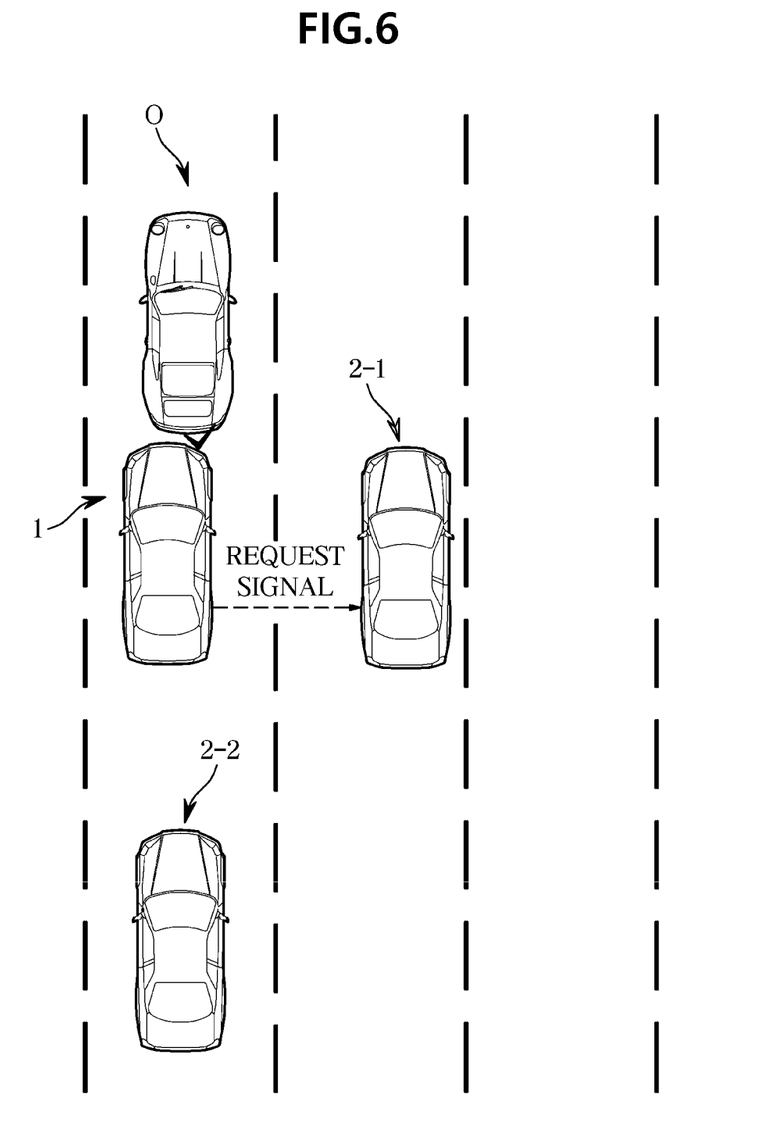
FIGS. 6 and 7 illustrate a transmission target of a signal requesting image data from a vehicle according to an exemplary embodiment.
Figure 7:
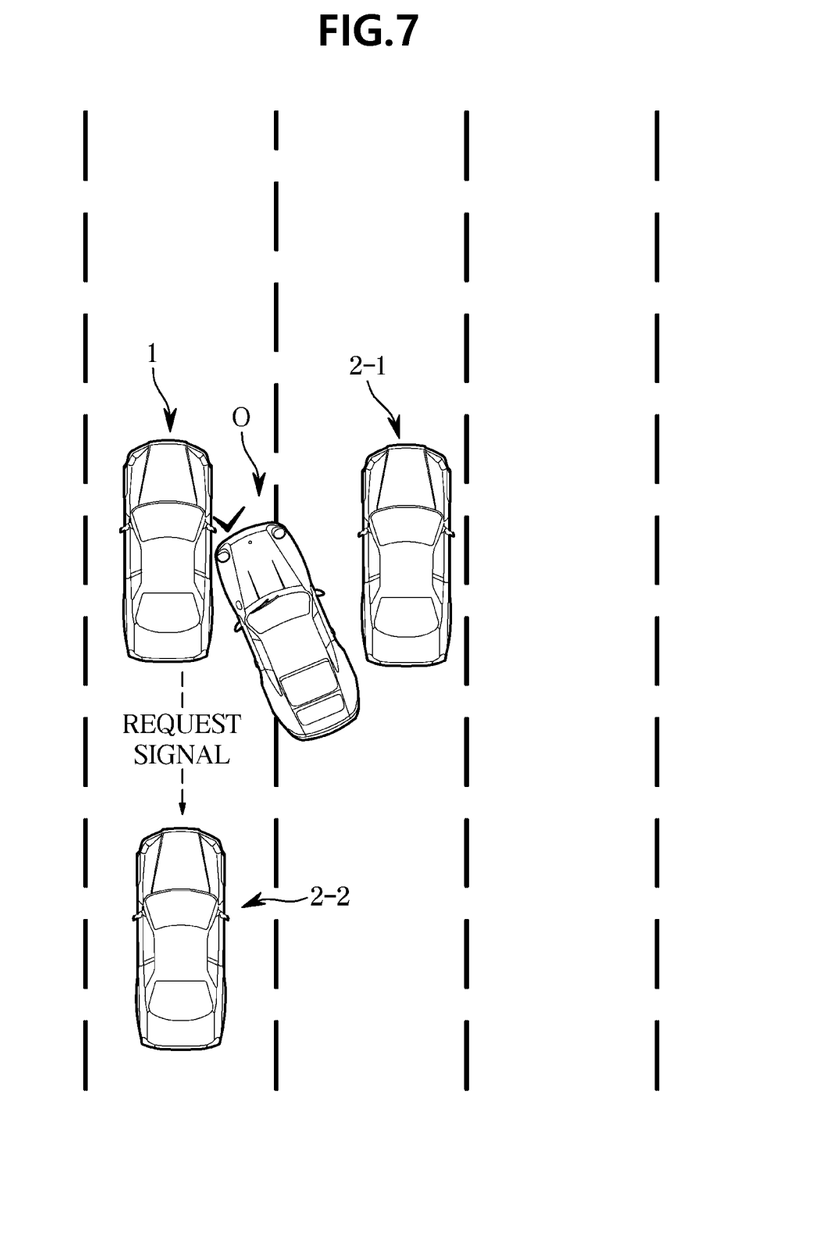

FIG. 5 illustrates a radius at which a vehicle collects image data according to an exemplary embodiment. And FIGS. 6 and 7 illustrate a transmission target of a signal requesting image data from a vehicle according to an exemplary embodiment. The vehicle 1 according to an exemplary embodiment may be configured to transmit a signal requesting image data to another vehicle within a predetermined radius. Referring to FIG. 5, to acquire image data from the vehicle 2-1 within a predetermined radius (first radius, R1), the vehicle 1 may be configured to transmit the request signal to the vehicle 2-1. In addition, if image data is not received from another vehicle within a predetermined radius, the vehicle 1 may be configured to change to a second radius R2 that is wider than the first radius R1 to secure the image data.

In addition, according to an exemplary embodiment, the predetermined radius may be changed according to the type of road on which the first vehicle 1 is traveling. For example, on a highway, a predetermined radius may have a greater value than a general road since high-speed roads have a relatively large number of lanes and a high driving speed compared to general or non-high speed roads. Meanwhile, the first vehicle 1 may be configured to adjust a transmission direction in addition to the transmission radius of the request signal. Accordingly, the first vehicle 1 may be configured to obtain image data from the second vehicle 2 in a position capable of sufficiently capturing a collision screen between the first vehicle 1 and the accident target vehicle.

Referring to FIG. 6, when a collision accident of the first vehicle 1 occurs with an accident target vehicle O in front of the first vehicle 1, the first vehicle 1 may be configured to transmit a signal requesting image data to the vehicle 2-1 on the right to acquire image data including the process of collision with the accident target vehicle O. According to one exemplary embodiment, when an accident of the first vehicle 1 occurs in the front or rear of the first or subject vehicle 1, the subject vehicle 1 may be configured to request image data from the vehicle 2-1 (e.g., the second vehicle) traveling from the left or the right with respect to the subject vehicle 1.

Referring to FIG. 7, when a collision accident of the first vehicle 1 occurs with an accident target vehicle O at the side of the first vehicle 1, the first vehicle 1 may be configured to transmit a signal requesting image data to the vehicle 2-2 in the rear to obtain image data including a process of collision with the accident target vehicle O. According to one exemplary embodiment, when an accident of the first vehicle 1 occurs on the side of the first vehicle 1, the first vehicle 1 may be configured to request image data from a vehicle 2-2 traveling from the front or rear relative to the first vehicle 1.

The second vehicle 2 may be configured to provide the image data to the first vehicle 1 in response to a signal requesting image data of the first vehicle 1 (404). However, unlike FIG. 4, the second vehicle 2 may be configured to provide the image data to the first vehicle 1 and at the same time or selectively provide the image data to the server 3. The first vehicle 1 may be configured to transmit image data to the server 3 (405).

When the server 3 receives the image data, it may be configured to generate fault ratio data based on the image data (406). The image data refers to data photographed immediately after a collision between the first vehicle 1 and the accident target vehicle, and the image data may correspond to image information photographed from various angles allowing the fault ratio between the two to be calculated. The server 3 may be configured to analyze the image data obtained from the outside of the first vehicle 1 by the second vehicle 2 and calculate a fault between the two through application of a simulation program stored in advance and current traffic regulations. In addition, the server 3 may be configured to request the image data to an expert in real time to generate fault ratio data through the fault ratio assessed by the expert. The server 3 may be configured to transmit the generated fault ratio data to the first vehicle 1 (407).

Figure 8:
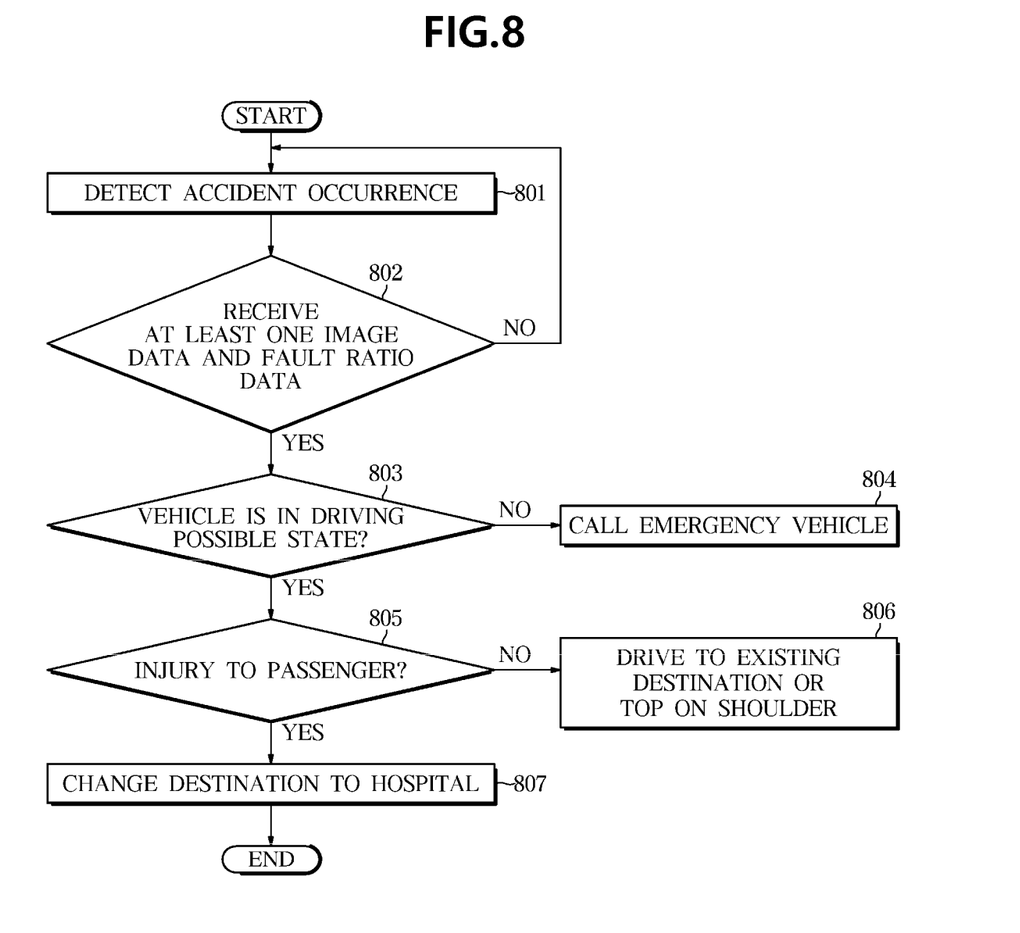
FIG. 8 is a flowchart of a method for controlling a vehicle according to an exemplary embodiment.

FIG. 8 is a flowchart of a method for controlling a vehicle according to an exemplary embodiment. The vehicle 1 may be configured to detect an accident (801) and determine whether at least one of image data and fault ratio data has been received (802). Accordingly, whether the driver of the vehicle 1 in which the accident has occurred has secured necessary data for future insurance processing or the like may be determined. Specifically, vehicle 1 may be config-ured to receive video data of the accident situation from other vehicles driving in a vicinity of the subject vehicle 1, or receive fault ratio data generated by server 3 based on video data provided by other vehicles.

When the vehicle 1 receives at least one of the image data and the fault ratio data, it whether the vehicle 1 is in a driving possible state (803) may be determined (by a controller), and in response to determining that the vehicle 1 is in a state in which driving is impossible since the degree of damage is greater than a certain level, the communicator may be operated to call an emergency vehicle (804). Conversely, in response to determining that the vehicle 1 is in a driving possible state, and by detecting the occurrence of an injury of the passenger (805), it may be possible to set a route to be driven later.

When the collision with the accident target vehicle is only a minor level, the vehicle 1 may be configured to operate the vehicle control device to drive to an existing destination or to stop on the shoulder (806). In addition, when the collision with the accident target vehicle is greater than a certain level, the vehicle 1 may be configured to change the destination to the hospital to guide the passenger to a nearby hospital, and operate the vehicle control device to reach the destination (807).

Meanwhile, the disclosed exemplary embodiments may be implemented in the form of a non-transitory recording medium storing instructions executable by a computer. The instruction may be stored in the form of a program code, and when executed by a processor, a program module may be generated to perform the operation of the disclosed exemplary embodiments. The recording medium may be implemented as a non-transitory computer-readable recording medium.

The non-transitory computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

In accordance with an aspect of the present disclosure, it may be possible to provide a vehicle and a controlling method thereof capable of providing efficient autonomous driving by changing the detection range and power consumption of the sensor according to the speed of the vehicle.

According to an aspect of the present disclosure, since processing after an accident by a driver is not required, secondary accidents and traffic congestion may be prevented. In addition, according to an aspect of the present disclosure, since information on the accident site is obtained from the outside, it may be possible to calculate a more accurate fault ratio in future insurance processing.

What is claimed is:

1. A vehicle, comprising:
  a communicator mounted on the vehicle and configured to perform wireless communication with a server;
  a controller configured to operate the communicator to transmit an accident reception request signal and image data acquired by a second vehicle to the server when the vehicle has an accident with an accident target vehicle, and operate the communicator to receive a fault ratio from the server when the server generates fault ratio data between the vehicle and the accident target vehicle based on the image data, wherein the controller is configured to operate the communicator to transmit the image data of the second vehicle within a predetermined radius from the vehicle to the server, and wherein the controller is configured to change the predetermined radius according to the type of road on which the vehicle is driving.

2. The vehicle according to claim 1, wherein the controller is configured to operate a braking device of the vehicle to stop the vehicle when the vehicle has an accident with the accident target vehicle.

3. The vehicle according to claim 2, wherein the controller is configured to determine a driving possible state of the vehicle and operate the vehicle to move to a shoulder in response to receiving at least one of the image data and the fault ratio data while the vehicle is in the driving possible state.

4. The vehicle according to claim 2, wherein the controller is configured to determine the driving possible state of the vehicle and operate the vehicle and guide to vehicle along a driving route to a hospital in response to receiving at least one of the image data and the fault ratio data while the vehicle is in the driving possible state.

5. The vehicle according to claim 1, wherein the controller is configured to operate the communicator to receive the image data directly from the second vehicle.

6. The vehicle according to claim 1, wherein the controller is configured to request the image data from the vehicles traveling on left or right sides of the vehicle when the vehicle accident occurs in front or rear of the vehicle.

7. The vehicle according to claim 1, wherein the controller is configured to request the image data from the vehicles traveling in front or rear of the vehicle when the vehicle accident occurs on a side of the vehicle.

8. A controlling method of a vehicle performing a wireless communication with a server, the method comprising:

transmitting, by a controller, an accident reception request signal and image data acquired by a second vehicle to the server when the vehicle has an accident with an accident target vehicle; and receiving, by the controller, a fault ratio from the server when the server generates fault ratio data between the vehicle and the accident target vehicle based on the image data, wherein transmitting of the image data to the server includes transmitting the image data of the second vehicle within a predetermined radius from the vehicle to the server, and wherein transmitting of the image data to the server includes changing the predetermined radius according to a type of road on which the vehicle is driving.

9. The method of claim 8 further comprising: operating a braking device of the vehicle to stop the vehicle when the vehicle has an accident with the accident target vehicle.

10. The method of claim 9, wherein the operating of the braking device includes determining a driving possible state of the vehicle and operating the vehicle to move to a shoulder in response to receiving at least one of the image data and the fault ratio data while the vehicle is in the driving possible state.

11. The method according to claim 9, wherein the operating of the braking device includes determining the driving possible state of the vehicle and operating and guiding the vehicle along a driving route to a hospital in response to receiving at least one of the image data and the fault ratio data while the vehicle is in the driving possible state.

12. The method according to claim 8, wherein receiving the image data includes operating the communicator to receive the image data directly from the second vehicle.

13. The method according to claim 8, wherein transmitting of the image data to the server includes requesting the image data from the vehicles traveling on left or right sides of the vehicle when the vehicle accident occurs in front or rear of the vehicle.

14. The method according to claim 8, wherein transmitting of the image data to the server includes requesting the image data from the vehicles traveling in front or rear of the vehicle when the vehicle accident occurs on a side of the vehicle.

15. A computer program stored on a recording medium, combining with a computing device, the computer program comprising to perform:

transmitting an accident reception request signal and image data acquired by a second vehicle to the server when a first vehicle has an accident with an accident target vehicle, and receiving a fault ratio from the server when the server generates fault ratio data between the first vehicle and the accident target vehicle based on the image data, wherein transmitting of the image data to the server includes transmitting the image data of the second vehicle within a predetermined radius from the vehicle to the server, and wherein transmitting of the image data to the server includes changing the predetermined radius according to a type of road on which the vehicle is driving.

16. The computer program according to claim 15, wherein transmitting the image data to the server includes operating the communicator to directly receive the image data from the second vehicle.

* * * * *